UNITED STATES PATENT OFFICE.

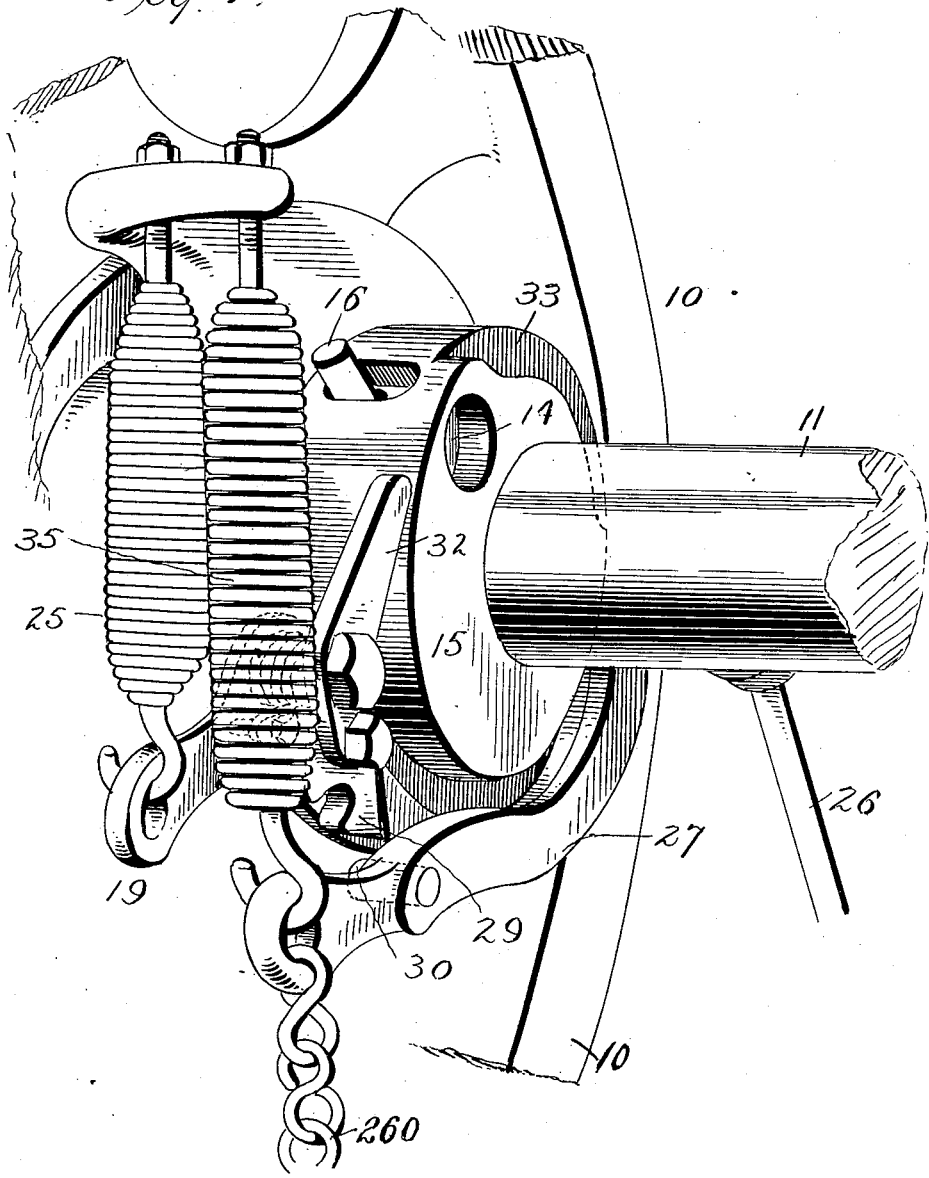

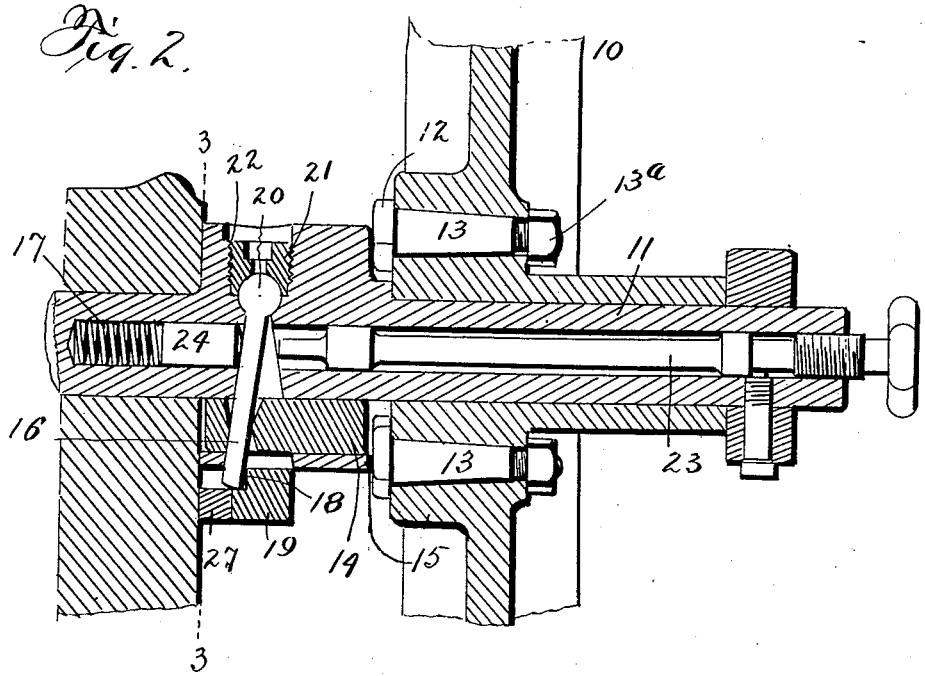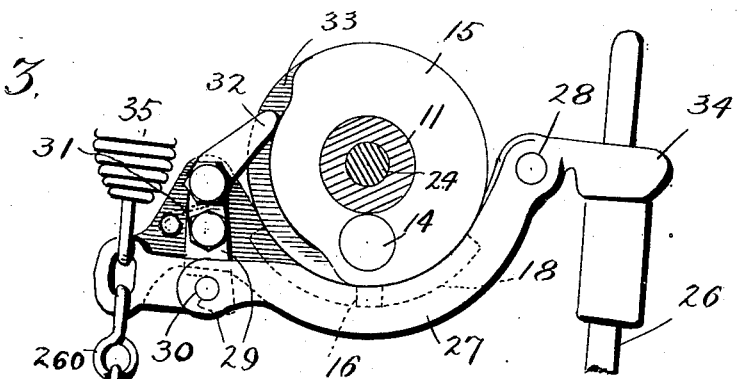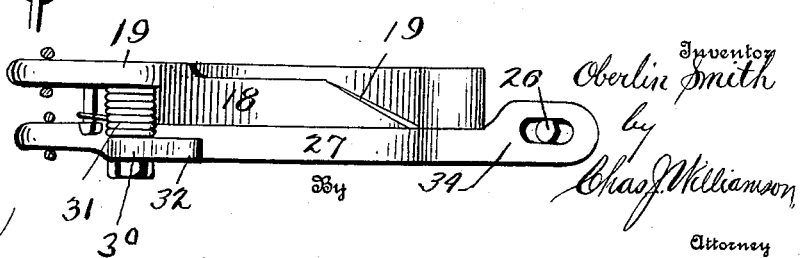

OBERLIN SMITH, OF BRIDGETON, NEW JERSEY.

CLUTCH.

1,086,865.

Specification of Letters Patent.

Patented Feb. 10, 1914.

Application filed June 12, 1912. Serial No. 703,342.

*To all whom it may concern:*

Be it known that I, OBERLIN SMITH, of Bridgeton, in the county of Cumberland, and in the State of New Jersey, have invented a certain new and useful Improvement in Clutches, and do hereby declare that the following is a full, clear, and exact description thereof.

My invention relates to clutches of the type shown in my United States Patent No. 579,019, issued March 16, 1897, and one object of my invention is to so change the construction and arrangement of parts thereof as will simplify and cheapen the construction and render it more durable, and render the operations of clutching and unclutching more easily performed.

Another object of my invention is to so construct the clutch-operating mechanism that the operation of unclutching will automatically take place even though the operator be inattentive or careless, so that, for example, in presses, the press will stop after one revolution of the main shaft regardless of the position of the lever which is under the power of the operator for throwing the clutch into action, and thereby avoid injury to either the operator or the press by the continued action of the latter after the desired time to stop it.

With the ends stated in view, my invention consists in the clutch having the construction substantially as hereinafter specified and claimed.

Referring to the drawings—Figure 1 is a perspective view of a clutch embodying my invention; Fig. 2 is a longitudinal section of the same; Fig. 3 is a section on the line 3—3 of Fig. 2; and Fig. 4 a top plan view showing the automatic safety unclutching device.

As is the case in the clutch of my patent above referred to, I illustrate my invention embodied in a power press having a band or fly wheel 10 journaled loosely upon the ram-operating shaft 11, and which is continuously revolved and is clutched to and unclutched from the shaft 11 to run and stop the press, and as is the case in the clutch of my said patent, I provide upon the inner face of the hub of the wheel 10 a circular series of studs or bosses 12 equidistant apart and consisting each of the head of a taper pin 13 that is secured to the wheel hub by a nut 13ª, with any one of which bosses a clutch pin 14 is adapted to engage, or from which it may be disengaged. The clutch pin or slide 14 is slidably mounted in an opening or passage formed in an annular enlargement or collar 15 of the shaft that lies parallel with the shaft axis.

As in the clutch of my aforesaid patent, the clutch pin or slide is moved into and out of clutching position by means of a lever 16, which lever is moved to throw the pin or slide into clutching engagement by means of a spring 17 and is automatically moved into unclutching position by means of a cam rib 18 on a lever 19 in the path of the projecting end of the pin-engaging lever 16, but in respect to their construction and arrangement, these various parts differ from the corresponding parts of my aforesaid patent as I will now proceed to point out.

In the clutch of my Patent No. 579,019, the clutch pin operating lever is a lever of the first order, that is, one in which the fulcrum is between the power and the weight, and experience has shown that by reason of the short leverage said lever affords for the action of the cam rib, the power required to operate said lever is so great and the cam-engaging end of it becomes seriously worn, and the situation of the spring is such that it is not only inconveniently located, but it operates at a disadvantage also because of the short leverage afforded. In the present case, the lever 16 has its fulcrum at its end opposite from that engaged by the cam rib 18, so that since the leverage is a long one, less power is required to operate it to move the clutch pin or slide out of engagement with one of the fly wheel bosses 12, and the wear on the rib-engaging portion of the lever is reduced to a minimum. The fulcrum of the lever 16 may consist, as shown in the drawings, of a ball-like or globular head 20, which is engaged by and has a bearing in a correspondingly shaped cavity in a cup 21 screwed into a threaded hole or socket 22 in the shaft collar 15 on the side diametrically opposite that from which the cam-rib-engaged end of the lever 16 projects. The spring 17 may be axially located in the extension of the longitudinal hole or passage in the shaft which is provided for a clutch lock 23 similar to that of my aforesaid patent, which location of the spring is not only convenient but it enables the spring to act to better advantage on the lever, since in such position it has a longer leverage. Preferably the spring acts upon the lever through a pusher block 24 interposed between the spring and the lever 16.

The lever 19, which carries the cam rib 18, is yieldingly held, by means of a spring 25, in a position which interposes the cam rib 18 in the path of the projecting end of the lever 16, so that by the engagement of the lever 16 with the cam rib 18, the lever will be swung to disengage the clutch pin or slide 14 from one of the bosses 12, and the shaft coming to a stop will retain the clutch pin or slide in such disengaged position. By swinging the lever 19 in opposition to the pull of the spring, as by means of a treadle-actuated push rod 26, as in the case of my aforesaid patent, or a chain 260 connecting the treadle and lever, the cam rib will be removed from the path of the projecting end of the lever 16, and thus the throwing of the clutch slide or pin into engaging position by the action of the spring 17 may take place, and the clutch engagement will continue so long as the cam rib 18 is kept out of the path of the projecting end of the lever 16. If immediately after the swinging of the lever 19 to free the lever end 16 from the control of the cam rib 18, the operator releases the treadle to permit the spring 25 to restore the cam rib to the path of the projecting end of the lever 16, the unclutching operation will take place when the shaft 11 has made one revolution, but if the operator through inattention or forgetfulness keeps the treadle depressed and thus holds the cam rib 18 out of the path of the projecting end of the lever 16, the operation of the press or machine will continue, with the possibility of injury to the operator or the machine. To prevent this, I automatically cause the throwing of the cam rib 18 into the path of the projecting end of the lever 16 when the shaft has completed one revolution, even though the operator may negligently keep the treadle depressed, and I accomplish this by the simple device of an extra lever 27 pivoted to the same pivot 28 to which the lever 19 is pivoted, and connect the two levers together by a button or latch 29 that is pivoted intermediate its ends to the lever 19 and engages a pin or stud 30 on the lever 27 with which it is held yieldingly in engagement by a spring 31. The latch 29 has a tail or finger 32 whose free end is extended toward the shaft collar 15 in position to coact with a cam groove 33 milled in the periphery of the collar at one end thereof through an angle of about 90 degrees, the extremity of the latch tail following the contour of the shaft collar dropping into the groove when it is contiguous thereto and rising out of the same by the action of the cam formation at the end thereof and bearing against the periphery of the shaft collar during the time such periphery is contiguous to said tail end. It will thus be seen that so long as the latch tail is in the cam groove the hook connection between the two levers 19 and 27 may be produced and is maintained, and when the free end of the latch tail is in contact with the remainder of the circumference of the shaft collar, the latch is disconnected from the stud of the lever 27 and cannot be made to engage therewith so that the lever 19 being disconnected from the lever 27 is not affected by the position of the lever 27.

The lever 27 has an arm or extension 34 with which the treadle-operated rod 26 engages, so that when the treadle-operated rod 26 is lifted, the lever 27 will be swung downward or outward, and through the latch 29 which connects the two levers together, the lever 19 will be swung with it, carrying the cam rib 18 out of the path of the projecting end of the lever 16. It will be evident that if while in this position of the parts due to continued depression of the treadle, the latch 29 is tripped to disengage it from the stud 30, the spring 25 will instantly throw the lever 19 upward or inward to place the cam rib 18 in the path of the projecting end of the lever 16 in readiness to engage the projecting end of the lever 16 and automatically unclutch the shaft and wheel. As has been before indicated, the two levers 19 and 27 are disengaged by the operation of the latch when the free end of the latch tail rides out of the cam groove and bears against the peripheral portion of the shaft collar that is of greatest diameter, and while the tail is in contact with the latter it is impossible to latch or hook the two levers 19 and 27 together, and thus I make it certain that the unclutching of the shaft and wheel shall take place on the completion of a single revolution of the shaft. The lever 27 has its own spring 35 similar to the spring 25 for rocking it in the direction opposite to that in which it is moved by the action of the treadle rod or chain.

It will be evident that by the improvements that I herein show and describe, not only do I simplify and cheapen my clutch, but it possesses important mechanical excellences, and safeguards the operator and the machine.

Having thus described my invention what I claim is—

1. In a clutch, the combination of a shaft, a wheel, a slide carried by the shaft located at one side of the wheel and movable into and out of engagement with the wheel side, a lever engaging the slide and extending on opposite sides thereof, a fulcrum for the lever on one side of the slide, a part movable into and out of position to act on the lever on the other side of the slide, operator-actuated means for moving said part out of position to act upon said lever and automatic means to move it into position to act upon said lever.

2. In a clutch, the combination of a shaft, a wheel, a slide carried by the shaft located at one side of the wheel and movable into and out of engagement with the wheel side, a lever passing through the slide and extending on opposite sides thereof, a fulcrum for the lever on one side of the slide, a part movable into and out of position to act on the lever on the other side of the slide, operator-actuated means for moving said part out of position to act upon said lever, and automatic means to move it into position to act upon said lever.

3. In a clutch, the combination of a shaft, a wheel, a slide carried by the shaft located at one side of the wheel and movable into and out of engagement with the wheel side, a lever engaging the slide and extending on opposite sides thereof, a fulcrum for the lever on one side of the slide, consisting of a screw cap, a part movable into and out of position to act on the lever on the other side of the slide, operator-actuated means for moving said part out of position to act upon said lever, and automatic means to move it into position to act upon said lever.

4. In a clutch, the combination of a shaft, a wheel, a slide carried by the shaft located at one side of the wheel and movable into and out of engagement with the wheel side, a lever engaging the slide and extending on opposite sides thereof, a fulcrum for the lever on one side of the slide, a part movable into and out of position to act on the lever on the other side of the slide, operator-actuated means for moving said part out of position to act upon said lever, automatic means to move it into position to act upon said lever, and a spring acting on the lever between the slide and the lever fulcrum.

5. The combination of two rotary elements to be clutched together, a clutch device carried by one of said elements and movable into and out of engagement with the other, two levers having a common pivot and lying alongside each other, one of which carries a cam for acting on said clutch device to disengage it, and the other lever being an operating lever, a latch arranged to connect said levers, means to operate the operating lever, automatic means to actuate said latch to disengage the two levers and means to operate the cam carrying lever independently of the operating lever.

6. The combination of two rotary elements to be clutched together, a clutch device carried by one of said elements and movable into and out of engagement with the other, two levers having a common pivot and lying alongside each other, one of which carries a cam for acting on said clutch device to disengage it, and the other lever being an operating lever, a latch pivoted to one of said levers having two arms, a projection on the other lever with which said latch arm is adapted to interlock, means to operate the cam carrying lever independently of the operating lever, and a cam carried by the driven rotary element with which the other arm of said latch coacts.

7. The combination of a wheel, and a shaft to be clutched together, a clutch including a slide carried by the shaft and movable into and out of engagement with a coöperating element on the wheel, a lever for reciprocating said slide that has an end projecting beyond the periphery of the shaft, a cam carrying lever movable into and out of position to coact with the projecting end of said slide operating lever, a second lever, a latch pivotally connected with one of said levers, a stud or pin on the other lever for engagement with said latch, and a cam carried by the shaft comprising portions of different radii with which cam said latch coacts.

In testimony that I claim the foregoing I have hereunto set my hand.

OBERLIN SMITH.

Witnesses:
 PERCIVAL H. SMITH,
 HUGH L. REEVES.

Copies of this patent may be obtained for five cents each, by addressing the "Commissioner of Patents, Washington, D. C."